L. R. SMITH.
APPARATUS FOR HARDENING FLAT CONCRETE WORK.
APPLICATION FILED OCT. 4, 1920.
1,388,128. Patented Aug. 16, 1921.
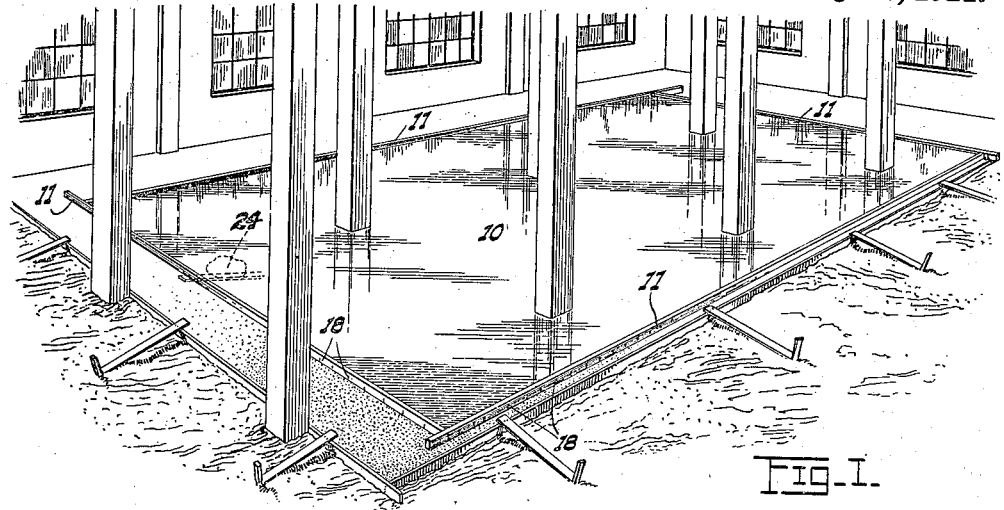
Fig. 1.
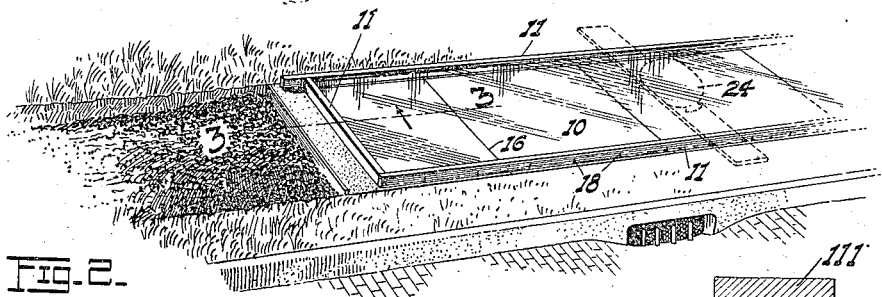
Fig. 2.
Fig. 6.
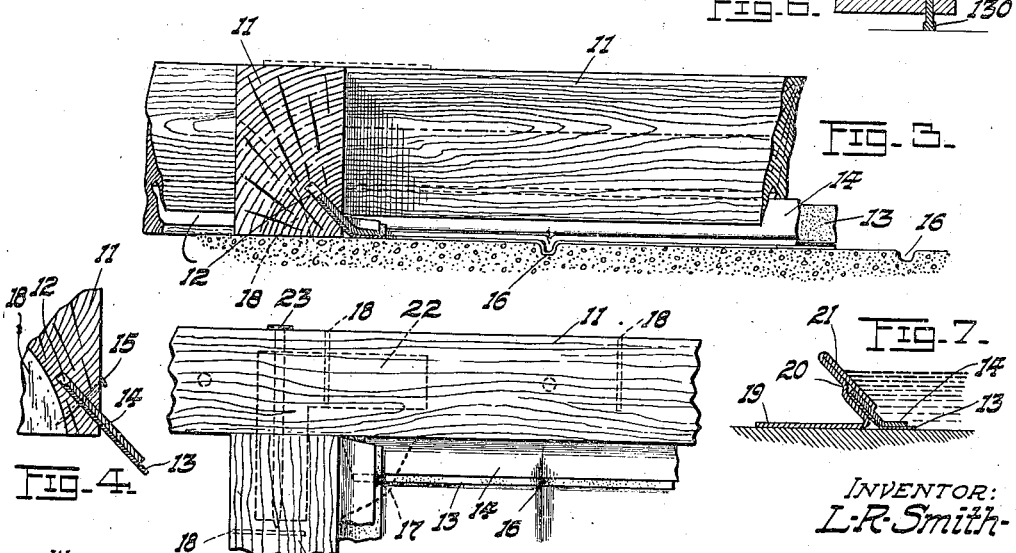
Fig. 3.
Fig. 4.
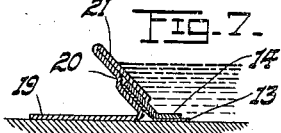
Fig. 7.
Fig. 5.
WITNESS:
INVENTOR:
L. R. Smith
BY
Erwin, Wheeler & Woolard,
ATTORNEYS.

UNITED STATES PATENT OFFICE.

LLOYD R. SMITH, OF MILWAUKEE, WISCONSIN, ASSIGNOR TO A. O. SMITH CORPORATION, OF MILWAUKEE, WISCONSIN, A CORPORATION OF NEW YORK.

APPARATUS FOR HARDENING FLAT CONCRETE WORK.

1,388,128.   Specification of Letters Patent.   Patented Aug. 16, 1921.

Application filed October 4, 1920. Serial No. 414,500.

*To all whom it may concern:*

Be it known that I, LLOYD RAYMOND SMITH, a citizen of the United States, and residing in the city of Milwaukee, county of Milwaukee, and State of Wisconsin, have invented certain new and useful Improvements in Apparatus for Hardening Flat Concrete Work, (Case #170;) and I do declare the following to be a clear, exact, and complete description thereof, such as will enable others skilled in the art to which the invention pertains to make and use the same, reference being had to the accompanying drawing as showing some forms of the devices in which the invention has been embodied.

My invention relates to an improved means employed for producing a superior grade of flat concrete work and is particularly applicable to the concrete floors of buildings. My invention relates also to an improved process of hardening such concrete work.

Ordinarily, concrete mixtures set with great rapidity, by reason of a quick absorption of the water contained in the mixture, this being due to the affinity of the cement for water. This is especially true of concrete floors in buildings, wherein the base of the floor has a thickness of a few inches only, the comparatively thin body of such a floor being conducive, further, to a very rapid evaporation of the moisture, with the result that the cement in the mixture is not adequately supplied with moisture and consequently does not have an opportunity to completely exercise its natural properties and bind the mass in the degree necessary to produce an enduring structure. The inability to retain a reserve or even a sufficient supply of moisture in the comparatively thin layer of concrete, reacts to prevent complete action by the cement, with the result that an inferior union takes place in the mixture. In floors so constructed, cracks develop by reason of the too rapid drying out of the surface, and there occurs a rapid deterioration, when heavy burdens are imposed thereon while in use, inasmuch as the lack of homogeneity in the concrete structure robs the floor of much of the cohesive strength which it should possess.

In rough cement work which is formed by pouring or "slushing," a quantity of water may be included in the mixture to maintain a moist condition for a length of time sufficient to enable the affinity of the cement for water to exhaust itself, and thus produce a cement structure which is entirely homogeneous. It is not, however, feasible to produce such solidarity in finished flat work, in which a lesser proportionate quantity of water is used, and in which the body of the cement must have acquired a reasonable degree of firmness, in order that the finishing operations upon the surface thereof, may be performed at the proper time. The quick absorption and partial evaporation of the water in such flat work, before the said cement has completely set, do not allow the demands of the cement for water to be fully satisfied. As a result of these natural conditions, it has been difficult to produce finished cement structures as thin layers, and maintain in the mixture a sufficient degree of moisture to answer the requirements of the cement and enable the latter to set properly. It follows, therefore, that work of this class is frequently defective in construction, and more or less unsatisfactory, according to its uses.

As hereinbefore indicated, a slow evaporation or absorption of the moisture contained in a concrete mixture when placed, tends to the attainment of a superior binding union of the cement, and several plans have been suggested for retaining moisture in the concrete structure, to retard the setting of the cement. Heretofore, the use of extraneous means in connection with the plan of retarding the evaporation of the moisture in concrete work has generally been limited to outdoor constructions, and particularly to the construction of concrete roadways and pavements. In such cases it has been the practice to cover the surface of the roadway or pavement, as soon as the concrete has received its initial set, with a deposit of moisture absorbing substance, such as earth. Also, it has been proposed to cover the surface of the concrete roadway with sawdust. These substances may be kept moistened for a considerable period of time.

But neither plan is productive of best results when applied to the floors of buildings; inasmuch as the amount of moisture which may be retained upon the surface of the concrete work is limited by the absorptive capacity of the materials used for covering the work. Nor can the flow of the water out of the covering material be prevented, by reason of its pervious character, and for this reason neither plan is efficient. These methods necessitate the work of applying the moisture absorbing covering material to the roadway, maintaining a moist condition therein, and in the end, the removal of the superfluous material used as a temporary covering for the concrete. The operation of applying moistened earth as a covering for the newly laid concrete surface, is an expensive procedure. Its use creates a disagreeable situation in the presence of a large volume of earth, much of which becomes changed into mud, and which requires much labor in effecting its removal.

With a view to surmounting the objections of the known methods, I have devised a portable dam intended primarily for use in connection with the floors of buildings, which portable dam may be placed in position with great facility, as soon as the surface of the floor has been given its finishing coat and the concrete has received its initial set. The dam which is employed in my invention, although portable, may be readily placed in position, so as to be practically water tight. Immediately upon placing the dam in position, the surface of the floor is flooded with water which is retained and impounded thereon by the presence of the surrounding dam. The presence of the flood of water upon the surface of the floor effectively maintains the desired degree of moisture in the concrete mixture, and enables the cement to set properly, so that the concrete structure is firmly united throughout, with a great increase in its strength and durability. After the water retained by the dam has fulfilled its purpose, it may be drawn off, and the concrete mixture will be found to be firmly bound together into a homogeneous mass of highly improved structure.

My invention comprises a series of bars, which constitute the retaining walls of the dam, and which are adapted to be arranged upon the surface of the floor so as to inclose the selected area thereof. Each of such bars, is provided with a means for sealing the bar to the floor, to prevent the escape of the water impounded by the dam. Such sealing means may be constituted of a strip of rubber or other impervious material extending longitudinally of the wall of the dam, and adapted to be held in a close contact or engagement with the surface of the concrete floor, by reason of the resiliency inherent in such strip. The sealing strip may be supplemented in its sealing action by means of a strip of lead, which by reason of its extreme ductility, may be made to conform quite readily to any slight undulations of the surface of the floor, and so insure the effective engagement of the sealing strip with the floor.

I find it expedient to place weights upon the bars forming the walls of the dam, in order to prevent displacement thereof, either by the lateral pressure of the water, or other accidental causes. In addition, the presence of such weights upon the dam forming bars serves to make more complete the closure against leakage of the impounded water.

The novel features of my invention will be pointed out in the appended claims.

In the accompanying drawings:

Figure 1 is a perspective view, showing a portion of the floor of a building, and illustrating also the manner of the application and use of my invention.

Fig. 2 shows how my invention may be applied to the surface of a pavement designed for the use of pedestrians.

Fig. 3 is an enlarged vertical sectional view, taken conveniently on the line 3—3, Fig. 2, looking in the direction of the arrow, and showing portions of the dam as they appear when arranged upon the surface of the concrete.

Fig. 4 is a fragmentary view, similar to Fig. 3, but showing the manner of securing the sealing strip in position in the bar which forms the wall of the dam, this view showing also one of the saw kerfs, which are made in the outer side of the dam forming bars, to prevent warping of such bars.

Fig. 5 is a plan view corresponding to Fig. 3, and indicating the manner of joining the dam forming bars at one corner.

Fig. 6 is a sectional view of a modified construction of one of the dam forming bars.

Fig. 7 shows in section a further modification of the construction of the dam forming bar.

Referring to the drawings, the numeral 10 in Fig. 1 indicates a sectional area of a concrete floor which has just been laid in a building. For the purposes of this invention, the concrete mixture used in producing the floor, will be assumed to be any usual one, with a finishing coat, and as having received its initial set. About such sectional area I place a dam composed of bars 11, which may be arranged so as to inclose the whole or a selected area of the surface of the floor. The bars 11 may be formed from strips of wood, which at one side near the corner are provided with a longitudinal groove 12. In the construction shown, I insert a sealing strip 13 of rubber or some other impervious and resilient material in the groove 12. A binding strip of sheet lead 14 may be wedged into the groove 12, above the sealing strip 13, and the two strips 13 and 14 may be secured in fixed relation in the said groove by means of nails 15 driven into the bar forming the wall of the dam at distributed points and passing through the said strips.

The bars forming the walls of the dam will then be placed in position with the sealing strip 13 resting upon the floor, under the pressure of the binding strip 14, and this ordinarily will be sufficient to retain the water within the dam. However, the projecting lead binding strip 14 may be pressed down upon the edge of the sealing strip 13, so as to fill any irregularities which may exist in the surface of the floor in the line of the application of the dam forming bars. As indicated in Figs. 3 and 5, the lead binding strip may be indented to hold the sealing strip in the scores 16, formed in the surface of the floor. In the angle, Fig. 5, I may place a gob of putty or clay, the location of which is indicated 17, to render the joint water tight at that point, if necessary. Corner plates 22 or nails 23, indicated by dotted lines in Fig. 5, may be used to hold the walls at the corners of the dam, if desired.

Fig. 6 shows a modification in the construction of the improved dam, in which a longitudinal groove is formed in the underside of the bar 111, forming the wall of the dam. A strip of rubber 130, is inserted in the said groove, and may stand in the vertical position shown with reference to the said bar, when the latter is placed in position upon the floor. The resiliency of the inserted sealing strip 130, will enable it to compensate for any unevenness in the surface of the floor, and effect a closure which will prevent the outflow of the water, when the bars 111 have been arranged so as to form a dam.

When wooden bars are used to form the walls of the dam, it is desirable that they be of good lengths, so as to facilitate their application in position. The tendency of such wooden strips to warp may be overcome by making in the outer side of each strip a succession of saw kerfs 18, one of which is indicated in Fig. 4.

Fig. 7 shows a modification in the construction of the bar which forms the wall of the dam. In this modified construction, the said wall forming bar is made from sheet metal, bent longitudinally so as to provide a footing 19, an upstanding angular support 20, and an overlapping portion 21. The sealing strip 13 and the binding strip 14 may be inserted and clamped between the parts 20 and 21, so that the said sealing strip will bear upon the surface of the floor, and prevent the escape of the water impounded by the dam, as in the construction first described.

The construction which I have described is a very economical one, and has proven efficient in operation. When the bars forming the walls of the dam are placed so as to inclose the selected area of the floor surface, and joined so as to make a tight closure, the water will be introduced into the dam so as to completely cover the inclosed surface of the floor. As stated hereinbefore, the presence of the water upon the surface of the floor will retard the setting of the cement in the concrete mixture, and by reason of the slow drying which then takes place, will cause the cement to bind the concrete mass into a homogeneous structure of the most substantial sort. When the floor has been treated in the manner described for the desired time, the extreme portability of the bars forming the dam will permit their ready and easy removal and arrangement elsewhere for further similar use, leaving no disagreeable muck of temporary covering material, which has to be removed before the floors are rendered serviceable and ready for use.

In order that the bars forming the side walls of the dam may not be displaced by the lateral pressure of the water and other accidental causes, I find it expedient to place upon the said strips, a series of weights 24.

Another important advantage which flows from the use of my invention resides in the fact that the flood of water upon the surface of the freshly laid mass of concrete, has proven a most effective barrier against the intrusion of careless and indifferent workmen, who despite obstructing barricades and warning signs persist in walking over green concrete surfaces, to the permanent disfigurement of the latter.

Having thus described my invention, what I claim and desire to secure by Letters Patent of the United States, is:

1. Means to inclose an area of a concrete floor and maintain a quantity of water on the surface thereof to retain moisture in the concrete mass and retard the setting of the cement, the said means comprising a portable dam, with resilient sealing provisions adapted to engage the surface of the concrete floor to prevent escape of the impounded water.

2. Means to inclose an area of a concrete floor and maintain a quantity of water on the surface thereof to retain moisture in the concrete mass and retard the setting of the cement, the said means comprising a portable dam the walls of which are composed of a series of bars, each of which is provided with a sealing means adapted to engage the surface of the concrete floor to prevent escape of the impounded water.

3. Means to inclose an area of a concrete floor and maintain a quantity of water on the the surface thereof to retain moisture in the concrete mass and retard the setting of the cement, the said means comprising a portable dam the walls of which are composed of a series of removable bars, each of which is provided with a resilient sealing means adapted to engage the surface of the concrete floor to prevent escape of the impounded water.

4. Means to inclose an area of a concrete floor and maintain a quantity of water on the surface thereof to retain moisture in the concrete mass and retard the setting of the cement, the said means comprising a portable dam the walls of which are composed of a series of bars, each of which is longitudinally grooved for the reception of a sealing strip which latter is adapted to engage the surface of the concrete floor to prevent escape of the impounded water.

5. Means to inclose an area of a concrete floor and maintain a quantity of water on the surface thereof to retain moisture in the concrete mass and retard the setting of the cement, the said means comprising a portable dam the walls of which are composed of a series of bars, each of which is provided with a sealing means adapted to engage the surface of the concrete floor to prevent escape of the impounded water, and additional means bearing upon the sealing means for insuring engagement of the said sealing means with the floor, as described.

6. Means to inclose an area of a concrete floor and maintain a quantity of water on the surface thereof to retain moisture in the concrete mass and retard the setting of the cement, the said means comprising a portable dam the walls of which are composed of a series of bars, each of which is grooved in the direction of its length, a sealing strip held in the said groove, and a ductile binding strip attached to the grooved bar and serving to hold the sealing strip in engagement with the surface of the floor, to prevent escape of the impounded water.

7. Means to inclose an area of a concrete floor and maintain a quantity of water on the surface thereof to retain moisture in the concrete mass and retard the setting of the cement, the said means comprising a portable dam the walls of which are composed of a series of bars, each of which is grooved in the direction of its length, a sealing strip in the said groove, and a ductile binding strip also in the said groove, the latter being adapted to conform the sealing strip to the undulations of the surface of the floor to prevent escape of the impounded water.

8. Means to inclose an area of a concrete floor and maintain a quantity of water on the surface thereof to retain moisture in the concrete mass and retard the setting of the cement, the said means comprising a portable dam the walls of which are composed of a series of bars, each of which is grooved longitudinally, a resilient sealing strip held in the said groove and adapted to be compressed against the surface of the floor to effect a close engagement therewith and prevent the escape of the impounded water.

9. Means to inclose an area of a concrete floor and maintain a quantity of water on the surface thereof to retain moisture in the concrete mass and retard the setting of the cement, the said means comprising a portable dam the walls of which are adjustable to the area of the floor which is to be treated, and sealing provisions between the said walls and the surface of the floor, said sealing provisions being effective to prevent escape of the impounded water.

10. Means for retarding the setting of the cement in flat concrete work, the said means comprising a portable dam adapted to inclose an area of the surface of the said work and maintain a water level thereon, and resilient sealing means between the dam and the said floor surface, said sealing means acting to prevent the escape of the impounded water.

11. A sealing means for temporarily maintaining a liquid covering upon flat surfaces, said means comprising a wooden bar, provided with a longitudinal groove at one side, a resilient and impervious sealing strip secured in said groove, and a ductile binding strip secured to the bar and adapted to bear upon the sealing strip to seal the bar to the flat surface to prevent the escape of the impounded liquid.

12. A sealing means for temporarily maintaining a liquid covering upon flat surfaces, said means comprising a wooden bar, provided with a longitudinal groove at one side, a resilient and impervious sealing strip secured in said groove, and a ductile binding strip secured to the bar and adapted to bear upon the sealing strip to seal the bar to the flat surface to prevent the escape of the impounded liquid, the said bar being saw kerfed transversely to overcome the tendency of the bar to warp.

In testimony whereof, I have signed my name at Milwaukee, this 27th day of September, 1920.

L. R. SMITH.

Witnesses:
W. F. WOOLARD,
ELIZABETH MURRAY.